July 15, 1941.  F. M. OWNER  2,249,165
LUBRICATION SYSTEM OF INTERNAL-COMBUSTION ENGINES
Filed Nov. 21, 1939  3 Sheets-Sheet 1
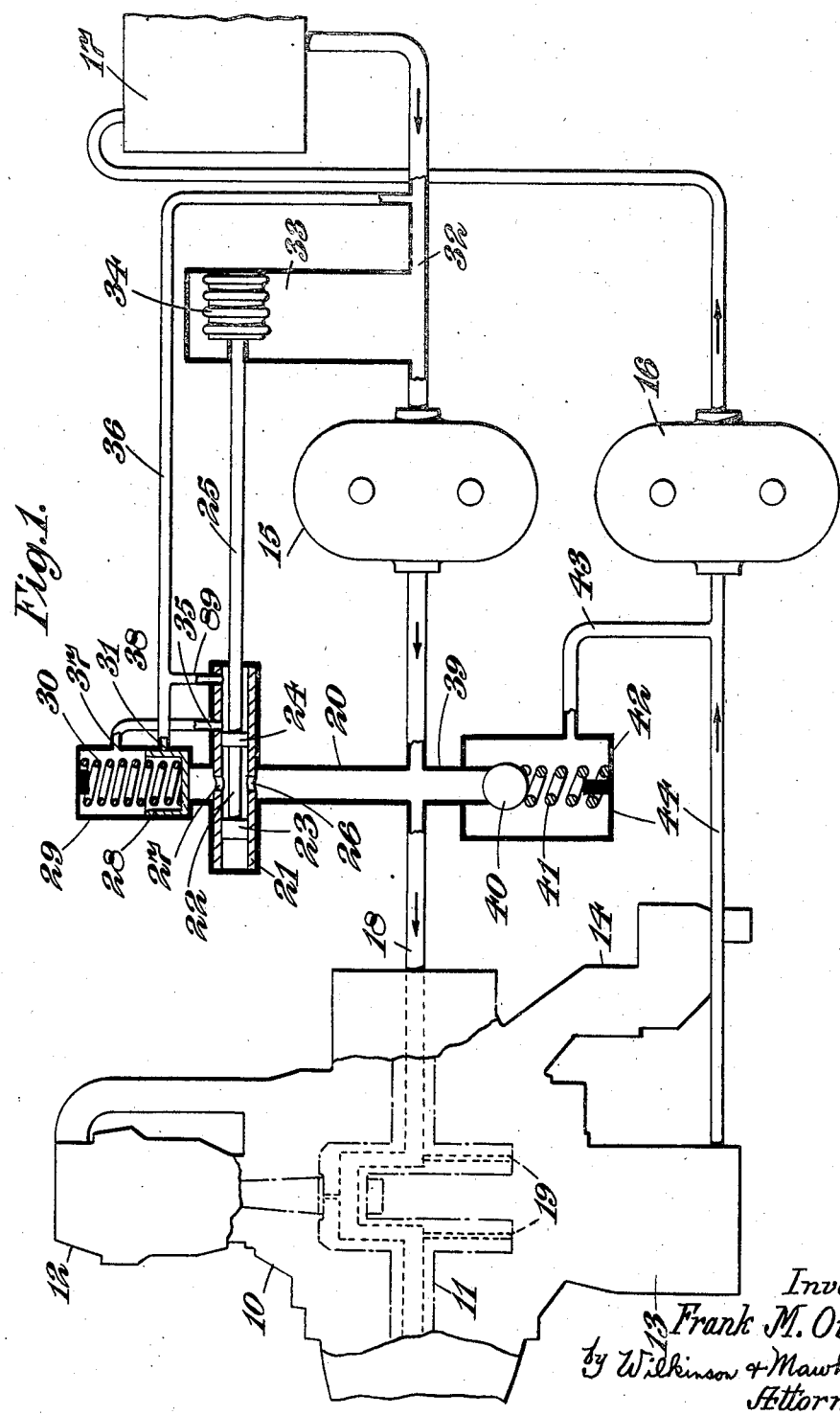
Inventor
Frank M. Owner
by Wilkinson & Mawhinney
Attorneys.

July 15, 1941.  F. M. OWNER  2,249,165
LUBRICATION SYSTEM OF INTERNAL-COMBUSTION ENGINES
Filed Nov. 21, 1939  3 Sheets—Sheet 2
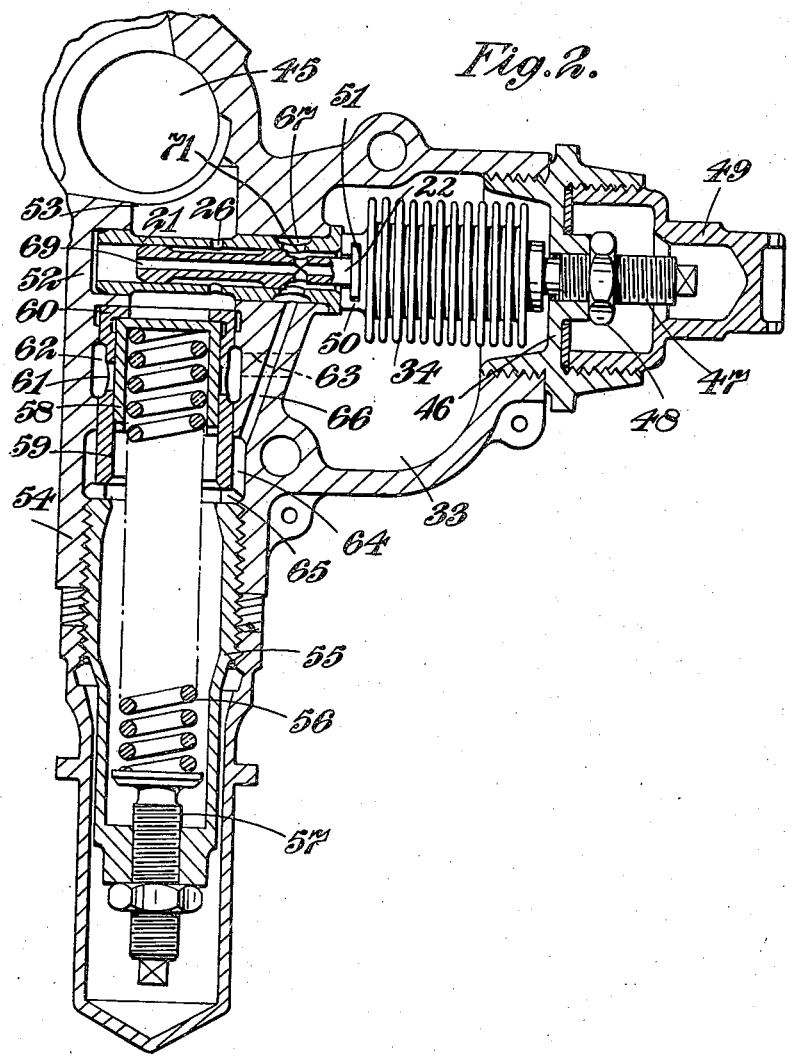
Inventor
Frank M. Owner
by Wilkinson & Mawhinney
Attorneys.

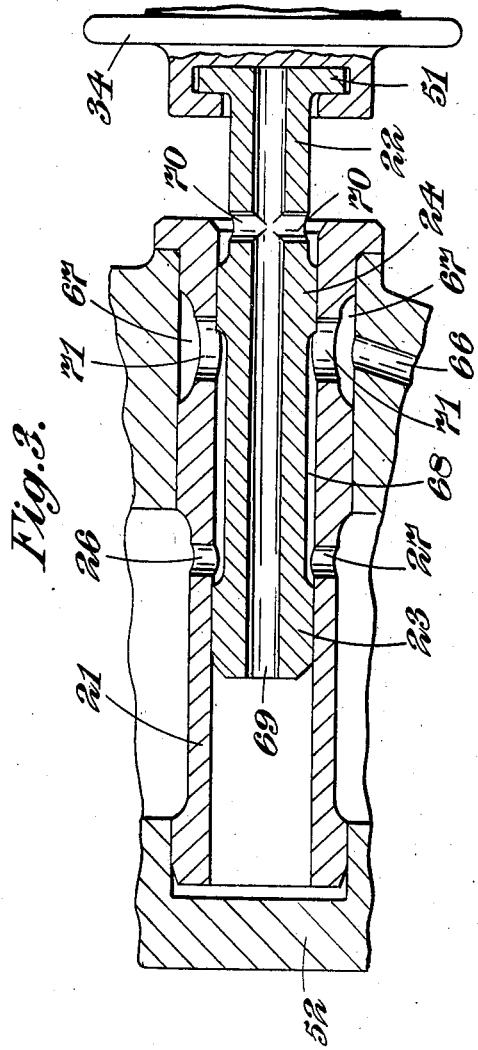

Patented July 15, 1941

2,249,165

UNITED STATES PATENT OFFICE 2,249,165

LUBRICATION SYSTEM OF INTERNAL-COMBUSTION ENGINES

Frank Morgan Owner, Bristol, England, assignor to The Bristol Aeroplane Company Limited, Bristol, England, a British company Application November 21, 1939, Serial No. 305,536
In Great Britain December 22, 1938

3 Claims. (Cl. 123—196)

This invention relates to the lubrication systems of internal-combustion engines.

It is usual to supply oil to the parts requiring lubrication by means of an engine-driven pump of which the discharge conduit communicates with a pressure-relief valve the function of which is to keep down to a predetermined value the pressure of the oil in the conduit. When the engine is started up from cold, particularly in cold climatic conditions, the high viscosity of the oil in the conduit makes an increased pressure necessary; but the pressure must be controlled, otherwise there is a risk of damage to the pump and other parts of the system.

The object of this invention is to ensure that, when the engine is started from cold, an adequate quantity of oil is supplied to the parts requiring it and, at the same time, to prevent the pressure in the conduit from reaching a dangerously high value.

According to the invention, the lubrication system of an internal-combustion engine comprises, in combination, an engine-driven pump, a conduit leading from the discharge side of the pump to the parts requiring lubrication, and means directly responsive to the temperature of the oil, or of the engine, and operative to maintain the pressure in the said conduit at one predetermined maximum when the engine is running at its normal temperature and at a higher predetermined maximum when the engine is cold.

The said conduit preferably communicates with two pressure-relief valves, one of which (the "normal-pressure valve") is normally operative to keep down the pressure in the conduit to a value sufficient for normal running conditions and the other of which (the "high-pressure valve") is operative to prevent the pressure in the conduit from exceeding a value substantially higher than the normal pressure. The said temperature-responsive means renders the normal-pressure valve inoperative when the engine is cold, so that the oil in the conduit is at the higher pressure permitted by the high-pressure valve. When the temperature of the oil has risen sufficiently to reduce the oil viscosity to the value at which the system is capable of working normally, the temperature-responsive device renders the normal-pressure valve operative whereby the high-pressure valve becomes inoperative.

It is to be understood that the oil is supplied to the parts requiring lubrication along the same conduit, whichever valve is in operation. No separate conduit is required for the supply of oil at the higher pressure.

The temperature-responsive means may render the normal-pressure valve inoperative by admitting the pressure oil to both sides of it or by closing its discharge port.

A specific embodiment of the invention will now be described, by way of example, with reference to the accompanying drawings of which—

Figure 1 is a diagram showing the hydraulic circuit of an internal-combustion engine according to the invention, Figure 2 shows the arrangement of the normal-pressure valve and the temperature-responsive means, and Figure 3 is an enlarged view of the slide-valve of Figure 2.

As shown in Figure 1, a radial-cylinder aircraft engine having a crank-case 10, crank-shaft 11, cylinders 12, oil-sump 13 and accessories 14 drives two oil-pumps 15, 16 of the intermeshing gear-wheel type, the pumps and other parts of the hydraulic circuit being shown diagrammatically to a greatly enlarged scale in relation to the size of the engine. The pump 15 (termed the "pressure-pump") draws lubrication oil from a tank or other reservoir 17 and delivers it under pressure along a conduit 18 to the interior of the crank-shaft 11 from which the oil passes to the various bearings requiring lubrication and the oil-sprays 19 formed in the crank-web balance-weights. The conduit 18 also supplies such hydraulic motors and relays (not shown) as require a supply of pressure liquid. The used lubricating oil is drained from the engine crank-case into the sump 13 from which it is sucked by the pump 16 (termed the "scavenge pump"), this pump returning the oil through a suitable cooler (not shown) to the tank 17.

The pressure-pump 15 and scavenge pump 16 are conveniently mounted in the same casing, in the usual way, and driven by the same shaft.

In the conduit 18 leading from the pressure-pump to the engine there is a branch-conduit 20 which leads to the valve-chest 21 of a slide-valve 22 which, in the preferred form of the invention illustrated, is a piston-valve having lands 23, 24 and an operating rod 25. The chest 21 is formed with ports 26, 27 through which the oil can normally gain access to the face of a valve 28 (the normal-pressure valve) which is slidable in a cylinder 29 which contains a compression spring 30 tending to hold the valve 28 in the position shown in which a lateral port 31 is closed by the skirt of the valve.

A conduit 32 leading from the tank 17 to the intake of the pressure-pump 15 is enlarged to form a chamber 33 containing a capsule 34 containing fluid having a suitable coefficient of expansion. The capsule is anchored at its right-hand end so that the changes in the temperature of the oil in the chamber 33 produce endwise movements of the free left-hand end and therefore of the rod 25. When the engine and oil are at their normal working temperature, the capsule 34 is expanded so that the rod 25 and piston-valve 22 occupy their extreme left-hand position as shown. In this position of the piston-valve the land 24 isolates a port 35 in the valve-chest 21 from oil entering the port 26. The strength of the spring 30 in relation to the area of the exposed face of the normal-pressure valve 28 is so chosen that the valve lifts against the force of the spring when the oil pressure in the conduit 20 exceeds 80 lbs. per square inch, and uncovers the port 31 whereby the pressure oil is discharged along a conduit 36 and returned to the conduit 32 on the intake side of the pressure-pump. At a point beyond the maximum movement of the valve 28, the valve-cylinder 29 is formed with another port 37 which is connected by a conduit 38 to the port 35 already referred to. Also the conduit 36 is connected by a short branch 89 to the interior of the valve-chest 21 on the right-hand side of the land 24.

When the engine is being started up from cold, the capsule 34 is collapsed so that the valve 22 is in a position in which the land 24 lies to the right of the port 35. Consequently the pressure of the oil in the conduit 20 is exerted not only on the face of the valve 28 through the ports 26 and 27 but also on the back of the valve through the port 35, the conduit 38 and the port 37. Consequently, the only unbalanced force acting upon the valve 28 is the pressure of the spring 30 so that, however much the oil pressure may rise, the valve 28 remains closed and the pressure is therefore not relieved.

Another branch-pipe 39 leads from the conduit 18 to a ball-valve 40 (the high-pressure valve above referred to) which is normally held on its seat by a strong spring 41 reacting against the other end 42 of the valve chamber. The strength of the spring 41 in relation to the area of the ball 40 is such that the valve 40 is lifted from its seat when the oil pressure of the oil in the branch 39 exceeds 200 lbs. per square inch. The valve then lifts and the pressure is relieved through a branch 43 to the conduit 44 leading from the sump 13 to the intake of the scavenge pump 16. The oil pressure in the system is thus prevented by the valve 40 from exceeding a certain maximum (such as 200 lbs. per square inch) and circulation of the oil at this pressure continues until the temperature of the engine and the oil rises to the normal working temperature. When the required working temperature is reached, the capsule 34 expands, moves the valve 22 to the position shown in Figure 1 whereby the port 35 is isolated from the oil in the conduit 20; the normal-pressure valve 28 thus becomes operative to prevent the oil pressure from exceeding the normal pressure (for example, 80 lbs. per square inch).

It will be seen from the above description that the temperature-responsive means 34 renders the normal-pressure valve 28 inoperative when the engine is cold so that the oil in the conduit 18 is at the higher pressure permitted by the high-pressure valve 40. Whether the oil is being delivered at the normal pressure or at the higher pressure, it is supplied to the engine along the conduit 18, no separate conduit being required for the supply of oil at the higher pressure.

It will be understood that Figure 1 is purely diagrammatic; the preferred construction of the normal-pressure valve, piston-valve, and associated parts will now be described with reference to Figures 2 and 3. The pressure-pump (not shown in Figure 2) takes in oil from a chamber 33 and delivers it under pressure to a chamber 45. The chamber 33 is closed by a diaphragm 46 into which the stem 47 of the temperature-responsive capsule 34 is screw-threaded, being secured in any desired position of adjustment by a lock-nut 48. The parts 47 and 48 are covered in by means of a screw-threaded cap 49. The capsule 34 is thus anchored at its right-hand end; its left-hand end carries a transversely slotted member 50 to engage the head 51 of the piston-valve 22 (see Figure 3). The valve 22 slides in a fixed sleeve 21 which is located in suitable holes in the pump-casing 52 and which controls a passage 53 leading from the pressure-chamber 45 to the normal-pressure valve which will now be described.

The casing 52 is formed with a tubular extension 54 into which is screw-threaded a tube 55. The tube 55 contains a compression spring 56 engaging at one end with an adjustable abutment 57 and at the other end with the interior of the cup-shaped normal-pressure valve 58. The valve 58 slides in a ported sleeve 59 having a flanged end 60 against which the valve normally abuts and radial ports 61 communicating with a passage 62 in the surrounding casing 54. The passage 62 communicates, by a passage shown diagrammatically at 63, with the intake-chamber 33 of the pressure pump. The outer end of the sleeve is surrounded by another chamber 64 which communicates with the interior of the valve 58 through a space 65, and through the oblique conduit 66 with an external groove 67 cut in the valve-sleeve 21.

The parts 59, 58, 56 of Figure 2 correspond respectively with the parts 29, 28 and 30 of Figure 1. The ports 61 of Figure 2 correspond to the ports shown diagrammatically as 31 in Figure 1 and the conduit 66 of Figure 2 corresponds to the conduit 38 of Figure 1. The preferred form of the piston-valve 22 is shown in Figure 3. The lands 23 and 24 are separated by a portion of somewhat reduced diameter 68 and the stem of the valve is drilled from end to end with a bore 69 which communicates with the intake-chamber 33 through transverse ports 70 formed near the right-hand end of the stem. The sleeve 21 is formed with the ports 26 and 27 in the manner already described with reference to Figure 1 and, in addition, is cut with radial ports 71 which connect the groove 67, and therefore the conduit 66, either to the ports 26 and 27, when the engine is cold, or to the space on the right-hand side of the land 24, when the engine is hot. The ports 71 correspond to the port 35 in Figure 1.

The purpose of the passages 69 and 70 is to prevent the development of high pressure or vacuum in the left-hand end of the valve-sleeve 21 such as would interfere with the free movement of the piston-valve 22. The communication between the inside of the valve-sleeve and the intake-chamber 33 is illustrated diagrammatically in Figure 1 by the pipes 89, 36 and 32 but it is unnecessary to provide the physical counterpart of the pipe 89 in the particular construction described with reference to Figures 2 and 3 since, as will be seen, the right-hand end of the sleeve 21 opens directly into the chamber 33.

The valve 22 is shown in Figure 2 in the position in which the capsule 34 is fully expanded as the result of the high temperature of the oil. The valve therefore isolates the ports 71 from the ports 26 and 27 whereby the normal-pressure valve 58 is operative to relieve the oil pressure in the chamber 45 when it tends to exceed the normal pressure of, say, 80 lbs. per square inch. Any rise in the pressure depresses the valve 58 as shown in Figure 2 whereby oil is returned through the chamber 62 and conduit 63 to the intake-chamber 33. On the other hand, Figure 3 shows the valve 22 in the position it occupies when the engine is cold and the capsule 34 collapsed. In this position the back of the normal-pressure valve 58 is subjected through the ports 71 and conduit 66 to the same pressure as the face of the valve. The valve is therefore held closed by the spring 56 in the manner already described with reference to Figure 1.

The collapsible capsule 34 is preferably spring-biased towards the position shown in Figure 2 so that, in the event of failure of the capsule, the lubrication system would operate at normal pressure.

I claim:

1. A lubrication system for an internal-combustion engine comprising, in combination, an engine-driven pump, a conduit leading from the discharge side of the pump to the parts requiring lubrication, two pressure-relief valves communicating with said conduit, one of which is normally operative to keep down the pressure in the conduit to a value sufficient for normal running conditions and the other of which is operative to prevent the pressure in the conduit from exceeding a value substantially higher than the normal pressure, and means directly responsive to the temperature of the oil and operative to render the normal-pressure valve inoperative when the engine is cold so that the oil in the conduit is at the higher pressure permitted by the high-pressure valve.

2. A lubrication system for an internal-combustion engine comprising, in combination, an engine-driven pump, a conduit leading from the discharge side of the pump to the parts requiring lubrication, two pressure-relief valves communicating with said conduit, one of which is normally operative to keep down the pressure in the conduit to a value sufficient for normal running conditions and the other of which is operative to prevent the pressure in the conduit from exceeding a value substantially higher than the normal pressure, and means directly responsive to the temperature of the oil to admit the pressure oil to both sides of the normal-pressure valve when the engine is cold so as to render the normal-pressure valve inoperative.

3. A lubrication system for an internal-combustion engine comprising, in combination, an engine-driven pump, a conduit leading from the discharge side of the pump to the parts requiring lubrication, two pressure-relief valves communicating with said conduit, one of which is normally operative to keep down the pressure in the conduit to a value sufficient for normal running conditions and the other of which is operative to prevent the pressure in the conduit from exceeding a value substantially higher than the normal pressure, a slide valve operative to render said normal-pressure valve inoperative, and means directly responsive to the engine temperature to actuate said slide valve when the engine is cold.

FRANK MORGAN OWNER.